(12) United States Patent
Lazzaro

(10) Patent No.: US 8,293,202 B2
(45) Date of Patent: Oct. 23, 2012

(54) COMPOSITIONS AND METHODS FOR COAGULATING SILICA FROM MINERAL PROCESSING STREAMS

(75) Inventor: Salvatore Lazzaro, Taylors Lakes (AU)

(73) Assignee: Huntsman Corporation Australia Pty Limited, Brooklyn, Victoria (AU)

( * ) Notice: Subject to any disclaimer, the term of this patent is extended or adjusted under 35 U.S.C. 154(b) by 459 days.

(21) Appl. No.: 12/680,748

(22) PCT Filed: Oct. 3, 2008

(86) PCT No.: PCT/IB2008/003853
§ 371 (c)(1), (2), (4) Date: Mar. 30, 2010

(87) PCT Pub. No.: WO2009/044298
PCT Pub. Date: Apr. 9, 2009

(65) Prior Publication Data
US 2010/0206777 A1    Aug. 19, 2010

Related U.S. Application Data

(60) Provisional application No. 60/977,561, filed on Oct. 4, 2007.

(51) Int. Cl.
*C10G 31/00* (2006.01)

(52) U.S. Cl. ........ 423/339; 423/335; 568/606; 525/374; 525/379; 525/382; 564/469; 564/470

(58) Field of Classification Search .................. 423/335, 423/339; 525/374, 379, 382; 564/469–470; 568/606
See application file for complete search history.

(56) References Cited

U.S. PATENT DOCUMENTS 8,012,573 B2 *   9/2011   Kowata et al. ............. 428/292.1
2005/0004236 A1   1/2005   Workman et al.

FOREIGN PATENT DOCUMENTS

AU   640296 B     6/1992
DE   19859288 A   6/2000

* cited by examiner

*Primary Examiner* — Brian McCaig
(74) *Attorney, Agent, or Firm* — Huntsman International LLC

(57) ABSTRACT

This idea relates to the use of polyalkylene glycols and non-salt polyether amines to improve the effectiveness of silica removal by coagulation and agglomeration of colloidal silica particles in aqueous mineral process streams.

15 Claims, No Drawings

COMPOSITIONS AND METHODS FOR COAGULATING SILICA FROM MINERAL PROCESSING STREAMS

CROSS-REFERENCE TO RELATED APPLICATIONS

This application is the National Phase of International Application PCT/IB2008/003853 filed Oct. 3, 2008 which designated the U.S. and which claims priority to U.S. Provisional App. Ser. No. 60/977,561 filed Oct. 4, 2007. The noted applications are incorporated herein by reference.

STATEMENT REGARDING FEDERALLY SPONSORED RESEARCH OR DEVELOPMENT

Not applicable.

BACKGROUND OF THE INVENTION

1. Field of the Invention

This invention relates to the field of chemical formulations and processes and more specifically to the use of polyalkylene glycols and non-salt polyether amines to agglomerate/coagulate silica particles in aqueous mineral process streams.

2. Background of the Invention

The presence of silica in mineral processing streams is a significant problem in the mineral processing industry. Natural silica as found in minerals has a low aqueous solubility. However when these minerals are digested in strong acids at elevated temperatures, large amounts of silicic acid is released. This silicic acid can then polymerise in solution to form colloidal silica. Such contaminants may cause difficulties in hydrometallurgical processes if not removed. For example, large quantities of silica, which are extracted in acid leaching of ores, form colloidal particles which, although not visible, may flocculate causing problems downstream by depositing on equipment and interfering with solvent extraction by forming "Pickering" emulsions and cloudy effluents. Such particles are generally less than 0.5 microns diameter.

Current methods to remove silica include using conventional filters. Colloidal silica particles will pass through conventional filters and, although membrane filters of appropriate fineness may be used to remove the silica. Given the fine particle size of the silica particles, use of such filters have the disadvantages of significantly increasing process times and expenses.

High molecular weight polyalkylene glycols (of molecular weight of about 1 million) have been used with some success in removing silica by agglomeration. However, such high weight polyoxyethylenes are not readily available and are expensive.

Lower molecular weight polyoxytheylenes, in combination with quaternary amines, have been used in some circumstances to remove silica, as described in Australian Patent No. 640296 which is hereby incorporated by reference. However, this process is not preferable in some circumstances, such as some hard water systems. Also, overtreatment with the strongly cationic quaternary amines may have the opposite effect of redispersing already agglomerated silica. In addition, it appears that the quaternary amines, which are positively charged species that form salts, function as a flocculant agent rather than as a coagulation agent. The term "flocculant agent" means, for the purposes of this application, a material that promotes the clumping of previously agglomerated particulates. Rather, the term "coagulation agent" means a material that promotes the initial agglomeration of individual particulates. Australian Patent No. 640296 supports this contention by reporting that the addition of the quaternary amine (flocculant agent) preferably occurs after the addition of the polyalkylene glycol (coagulation agent) and that reversing this order results in decreased effectiveness. (Page 5, Lines 18-24). Additionally, this patent reports that using quaternary amines generally increases the size of the agglomerated silica particles from less than 0.5 microns, to at least 1.0 microns (Page. 5, Lines 33-37), supporting the contention that the quaternary amine functions as a flocculant agent.

Consequently, there is a need for an improved compositions and methods for the agglomeration and removal of silica from aqueous mineral process streams. Also there is a need for compositions that provide improved coagulation properties.

SUMMARY OF INVENTION

Embodiments of the present invention disclose a composition for agglomerating silica particles in an aqueous mineral process stream. The composition includes a non-salt polyether amine and a polyalkylene glycol.

In other embodiments, a method is disclosed for agglomerating silica particles in an aqueous mineral process stream. An agglomeration composition is contacted with the silica particles in the aqueous mineral process stream to form agglomerated silica particles. The agglomeration composition includes a non-salt polyether amine and a polyalkylene glycol.

The foregoing has outlined rather broadly the features of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

DETAILED DESCRIPTION OF THE INVENTION

In an embodiment of the present invention an agglomeration composition is disclosed that includes a non-salt polyether amine and a polyalkylene glycol. The non-salt polyether amine differs from the quaternary amines (that are salts) previously used in silica removing applications. It is believed that the non-salt polyether amine acts as a co-coagulant agent, along with the polyakylene glycol coagulation agent, to promote agglomeration of silica particulates. This differs from quaternary amines that act as flocculating agents.

Non-salt polyether amines may include a polyether monoamine, a polyether diamine, and combinations thereof. The polyether monoamines may include chemicals of formula (I):

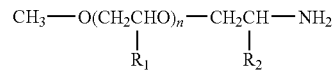

wherein $R_1$ is any combination of H or $CH_3$, $R_2$ is $CH_3$ or H, and n is an integer >1.

The polyether diamines may include chemicals of formula (II):

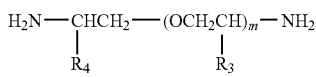

wherein $R_3$ is any combination of H or $CH_3$, $R_4$ is $CH_3$ or H, and m is an integer >1.

In other embodiments, the polyether diamine may include the specific chemical of formula (III):

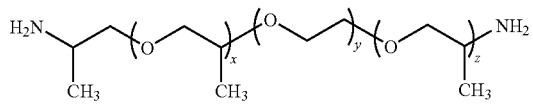

wherein $y \geq 1$, and x and z are independently $\geq 0$, with the proviso that $x+z \geq 1$.

In some embodiments, the chemical of formula (III) has y in the range of about 35 to about 45. In one embodiment, y is about 37 to about 41. In one embodiment $x+z=6$. In yet another embodiment y is about 39 and $x+z=6$ and the chemical has a molecular weight of about 2000. In some embodiments, the non-salt polyether amines may have a molecular weights above 4000. Examples of suitable non-salt polyether amines include XTJ-502 polyether diamine which is available from the Huntsman Corporation of the Woodlands, Tex. One skilled in the art, with the benefit of this disclosure, will recognize appropriate non-salt polyether amines for use in embodiments of this invention.

In other embodiments, the agglomeration composition may include other amines in addition to the non-salt polyether amines. Additional amines may include monoamine, diamines, tertiary amines, quaternary amines and mixtures thereof. For example, the agglomeration composition may further include a quaternary amine such as poly-DADMAC (poly-diallyldimethylammonium chloride) to promote flocculation of the agglomerated silica particles. One skilled in the art, with the benefit of this disclosure will recognize appropriate amines that may be added to the agglomeration composition of the present invention.

The agglomeration composition further includes a polyalkylene glycol. The polyalkylene glycol acts as a coagulation agent to agglomerate the silica particulates. Polyalkylene glycols may include polypropylene glycols, condensation products of alkylene oxides with active hydrogen compounds such as water, alcohols, phenols, ammonia, primary and secondary amines, carboxylic acids alkyl phenols, esters of carboxylic acids and esters of polyalkylene glycols and mixtures thereof; block and random mixed polyethylene/polypropylene glycols; and alcohol alkoxylates including the condensation products of alcohols with ethylene oxide and propylene oxide and ethylene oxide/propylene oxide mixtures.

In some embodiments, the polyalkylene glycol may comprise polyethylene glycol, which may also go by the name polyoxyethylene. In some embodiments, the polyethylene glycol may have a molecular weight up to about 500,000. In embodiments of the present invention, the polyethylene glycol has a molecular weight up to about 30,000. In other embodiments, the polyethylene glycol has a molecular weight in the range from about 600 to about 30,000. In other embodiments, the polyethylene glycol has a molecular weight in the range from about 1000 to about 30,000. In another embodiment, the polyethylene glycol has a molecular weight in the range from about 6000 to about 10,000. In another embodiment, the polyethylene glycol has a molecular weight in the range of about 8,000. One skilled in the art, with the benefit of this invention, will recognize suitable polyalkylene glycols for use in embodiments of this invention.

The agglomeration composition may further include flocculant agents. Flocculant agents may include particulate materials, a polymeric flocculants, and combinations thereof. Suitable flocculants may include polymeric flocculants derived from polymerization of monomers selected from the group consisting of 2-aminoethyl methacrylate, 2-aminoethyl acrylte, 2-dialkylaminoethyl acrylate, mixtures thereof and salts thereof with co-monomers selected from the group of acrylamide, methacrylamide, vinyl acetate, diallyldimethyl-ammonium halide and acrylic, methacrylic, and acrylamidomethylpropanesulfonic acids and salts or esters thereof. Suitable flocculant agents chosen from particulant materials may include clays, minerals and particulate alumina. Particulate alumina is known to promote separation of silica which forms a coating on alumina particles. Also quaternary amines may be included in this category. One skilled in the art, with the benefit of this disclosure, will recognize appropriate flocculant agents for use in embodiments of the present invention.

In other embodiments of the present invention, a method is disclosed for removing silica particles from an aqueous mineral process stream. An agglomeration composition, as described in the above embodiments, is contacted with the silica particles in the aqueous mineral process stream to form agglomerated silica particles.

In another embodiment of the present invention, flocculant agents may be added to the aqueous mineral process stream or to the agglomeration composition and contacted with the agglomerated silica particles to promote flocculation of the agglomerated silica particles.

In another embodiment, the method further includes the step of removing the agglomerated silica particles from the aqueous mineral process stream. This may be done by numerous processes known to those skilled in the art and may include filtering, settling, flocculating (as mentioned above), and combinations thereof.

It has been found that polyoxyethylene and polyether amines as defined above can broaden and improve the effectiveness of silica removal by coagulation in aqueous mineral streams following acid leaching.

Although the present invention and its advantages have been described in detail, it should be understood that various changes, substitutions and alterations may be made herein without departing from the spirit and scope of the invention as defined by the appended claims.

What is claimed is:

1. A composition for agglomerating silica particles in an aqueous mineral process stream comprising:
   a non-salt polyether amine; and
   a polyalkylene glycol.

2. A composition of claim 1 wherein the polyalkylene glycol comprises a polyethylene glycol.

3. A composition of claim 2 wherein the polyethylene glycol has a molecular weight in the range from about 600 to about 30,000.

4. A composition of claim 1 wherein the non-salt polyether amine is selected from the group consisting of: a polyether monoamine, a polyether diamine, and combinations thereof.

5. A composition of claim 4 wherein the polyether monoamine comprises a chemical of formula (I):

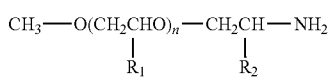

wherein $R_1$ is any combination of H or $CH_3$, $R_2$ is $CH_3$ or H, and n is an integer >1.

6. A composition of claim 4 wherein the polyether diamine comprises a chemical of formula (II):

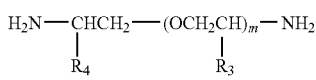

wherein $R_3$ is any combination of H or $CH_3$, $R_4$ is $CH_3$ or H, and m is an integer >1.

7. The composition of claim 6 wherein the polyether diamine comprises a chemical of formula (III):

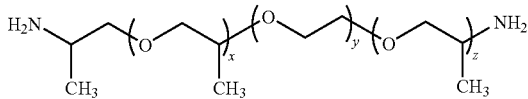

wherein $y \geq 1$, and x and z are independently $\geq 0$, with the proviso that $x+z \geq 1$.

8. The composition of claim 1 further comprising at least one flocculant agent.

9. The composition of claim 8 wherein the at least one flocculant agent is selected from the group consisting of: a particulate material, a polymeric flocculant, and combinations thereof.

10. A method for agglomerating silica particles in an aqueous mineral process stream comprising the steps of:
providing an agglomeration composition comprising a non-salt polyether amine and a polyalkylene glycol; and
contacting the agglomeration composition and the silica particles in the aqueous mineral process stream to form agglomerated silica particles.

11. The method of claim 10 wherein the polyalkylene glycol comprises a polyoxyethylene with a molecular weight up to about 500,000.

12. The method of claim 10 wherein the non-salt polyether amine comprises a chemical of formula (III):

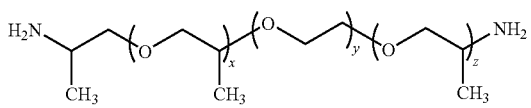

wherein $y \geq 1$, and x and z are independently $\geq 0$, with the proviso that $x+z \geq 1$.

13. The method of claim 10 further comprising contacting at least one flocculant agent to the agglomerated silica particles.

14. The method of claim 10 further comprising the step of removing the agglomerated silica particles from the aqueous mineral process stream.

15. The method of claim 14 wherein the removing the agglomerated silica particles is selected from the group consisting of: filtering, settling, flocculating, and combinations thereof.

* * * * *